United States Patent [19]
DeMoss

[11] Patent Number: 6,016,527
[45] Date of Patent: Jan. 18, 2000

[54] METHOD AND APPARATUS FOR IMPROVING FAIRNESS IN SCSI BUS ARBITRATION

[75] Inventor: Robert A. DeMoss, Wichita, Kans.

[73] Assignee: LSI Logic Corporation, Milpitas, Calif.

[21] Appl. No.: 08/724,596

[22] Filed: Sep. 30, 1996

[51] Int. Cl.[7] .................................................. G06F 13/14
[52] U.S. Cl. .......................... 710/117; 710/113; 710/107; 710/45
[58] Field of Search ..................................... 395/281, 282, 395/283, 284, 287, 291, 293, 295, 296, 297, 298, 304, 438, 439, 441, 865, 303, 305, 728, 729, 731–732

[56] References Cited

U.S. PATENT DOCUMENTS

| | | | |
|---|---|---|---|
| 4,972,313 | 11/1990 | Getson, Jr. et al. | 364/200 |
| 5,081,578 | 1/1992 | Davis | 395/325 |
| 5,175,822 | 12/1992 | Dixon et al. | 395/275 |
| 5,204,951 | 4/1993 | Keener et al. | 395/325 |
| 5,241,632 | 8/1993 | O'Connell | 395/292 |
| 5,414,818 | 5/1995 | Henson et al. | 395/325 |
| 5,448,709 | 9/1995 | Chandler et al. | 395/872 |
| 5,506,968 | 4/1996 | Dukes | 395/728 |
| 5,519,837 | 5/1996 | Tran | 395/291 |
| 5,526,496 | 6/1996 | Alnuweiri | 395/305 |
| 5,528,765 | 6/1996 | Milligan | 395/287 |
| 5,528,767 | 6/1996 | Chen | 395/293 |
| 5,572,687 | 11/1996 | Alnuweiri | 395/303 |
| 5,577,207 | 11/1996 | Pauget et al. | 395/200.02 |
| 5,682,555 | 10/1997 | Yamamoto et al. | 395/886 |
| 5,715,406 | 2/1998 | Henson et al. | 395/287 |

OTHER PUBLICATIONS

Elements of Queuing Theory for System Design; A.O. Allen; 1975; pp. 161–187.

*Primary Examiner*—Ayaz R. Sheikh
*Assistant Examiner*—Raymond N Phan

[57] ABSTRACT

Methods and associated apparatus for improving the fairness of bus allocation in association with standard SCSI bus arbitration. The present invention provide a plurality of time slots each of which define a delay period following the SCSI specified minimum period before arbitration is allowed to begin. Each device which requires arbitration on the SCSI bus pseudo-randomly selects one of the time slots before attempting SCSI bus arbitration. The device then delays the associated period of time before commencing SCSI bus arbitration. At any time before the end of the delay period, if the device senses that the SCSI bus has again become busy, then the device has already lost the arbitration without actually competing therefore. A second device, having selected a time slot with a shorter delay period, has won control of the SCSI bus before the first device attempted arbitration. The time slots are selected with a probability associated with each slot. To reduce the maximum added delay in arbitration, heuristic methods are applied to reduce the number of time slots and assign the probabilities to each slot for use by each SCSI. A first preferred embodiment assigns probabilities for up to seven SCSI devices sharing four time slots. A second preferred embodiment assigns probabilities for up to fourteen SCSI devices sharing five time slots. The methods of the present invention may be embodied in control programs operable within the SCSI devices or in mounting components (boards, cables and canisters) which physically and electronically connect the devices to a SCSI bus.

26 Claims, 5 Drawing Sheets

METHOD AND APPARATUS FOR IMPROVING FAIRNESS IN SCSI BUS ARBITRATION

BACKGROUND OF THE INVENTION

1. Field of the Invention

The present invention relates to bus arbitration and in particular to an improved method and associated apparatus for improving fairness in SCSI bus arbitration among a plurality of devices such as in a RAID storage subsystem.

2. Discussion of Related Art

When a plurality of devices are attached to a common electronic bus or other communication medium, multiple of the devices may simultaneously require use of the bus for exchange of signals. A method which determines which of several such competing devices is granted use of the common bus is often referred to as an arbitration method or simply bus arbitration.

A common bus arbitration method assigns a priority value or signal to each of the competing devices. The highest priority of the competing devices is first granted the bus, followed by other lesser priority devices. For example, in SCSI bus arbitration (as defined by the ANSI published SCSI 2 Standards Specification X3T9.2/375R Revision 10L), each device is assigned an ID value. When requesting the bus, each device applies a signal to the bus indicative of its priority and its desire to obtain the bus. Each device, so competing for the SCSI bus, determines whether any higher priority device (as determined by the device ID numeric value and the associated signal lines on the SCSI bus) is arbitrating for the SCSI bus. If a higher priority device is arbitrating for the SCSI bus (during the specified bus arbitration period), then the lower priority device will relinquish its request until the next arbitration period.

Under heavy bus utilization, such a priority based bus arbitration method will cause low priority devices on the bus to frequently lose the arbitration. The low priority devices will therefore suffer significant delays in reconnecting to complete their respective I/O operations. In RAID disk arrays, for example, a plurality of disk drives are aggregated and managed by a controller in such a manner as to appear as a single large, reliable disk. Information stored on such a disk array may be distributed across several of the disk drives in the disk array. A single I/O request directed to the disk array controller from an attached host computer system may therefore require low level I/O operations be performed on some or all of the disk drives in the disk array. The disk drives of the disk array may be distributed across a plurality of I/O channels (such as SCSI busses), but typical configurations share a single SCSI bus for several disk drives of the disk array. Since a single I/O request may involve several disk drives in the disk array, the performance of the RAID subsystem will be gated by the performance of the lowest priority disk drives in the shared bus. This problem is exacerbated by the addition of multiple RAID controllers concurrently processing I/O requests and the extension of SCSI standards to permit 14 devices per SCSI bus.

Priority based arbitration methods (as in the SCSI 2 specifications for example) are therefore unfair in their determination of which of a plurality of devices on the shared bus wins in arbitration. Higher priority devices will tend to preclude access to the bus for lower priority devices. The effects of this unfairness can be quantified by, for example, comparing the average delays for a SCSI reconnection to any disk drive in an array (averaged over all priorities) to the average delays incurred by reconnection of disk drives operable in accordance with an arbitration method adapted for improved fairness. It has been determined from such measurements that a fair arbitration method can improve the overall performance of a RAID subsystem by reducing the average I/O operation completion time. Such improvements can be especially beneficial where multiple RAID controllers are simultaneously generating I/O operations on one or more common SCSI busses filled to capacity with disk drives (a common configuration in most RAID subsystems).

However, prior methods for improving the fairness of arbitration have done so at a significant cost stemming from complexity of their solutions or performance costs arising from extension of the time for SCSI bus arbitration. Excessively extending the arbitration time reduces the RAID subsystem performance by adding idle time (the period of time during arbitration in which no data is transferred).

It can be seen from the above discussion that a need exists for improved arbitration techniques which improve fairness of the bus allocation while reducing time extensions of the bus arbitration cycle.

SUMMARY OF THE INVENTION

The present invention solves the above and other problems, thereby advancing the state of the art, by providing SCSI bus arbitration methods and associated structure which improves the fairness of SCSI bus arbitration. The improved fairness of SCSI bus arbitration, in turn, improves the overall performance of a RAID storage subsystem. In particular, the methods and structure of the present invention provide for a number of slots in which one or more of the disk drives of the disk array may arbitrate. Each slot is characterized by an additional incremental delay beyond the minimum standard period before arbitration may begin. According to the SCSI 2 specifications, a device may begin arbitration 0.8 μs after the BUS FREE state is detected (the BUS FREE DELAY time in accordance with the SCSI specifications also referred to herein as BFD). The device may then wait any additional period of time to start arbitration so long as the bus remains in the BUS FREE state. If a drive waits longer than 1.8 μs after detecting the BUS FREE state, it may lose arbitration to faster devices regardless of relative priorities. The methods and structure of the present invention therefore define a fixed incremental delay, associated with each slot, after the initial 0.8 μs delay following detection of BUS FREE before starting arbitration in each slot. Within each such slot, all drives arbitrating therein will do so in accordance with the standard arbitration of the SCSI 2 specifications. Each drive randomly selects one of the slots for possible arbitration before such arbitration is begun. Since each drive is randomly matched with a portion of the other drives on the SCSI bus, the likelihood of winning arbitration becomes a statistical, probabilistic function which more fairly distributes allocation of the bus over the drives on each SCSI bus.

More specifically, the delay before beginning arbitration following detection of the BUS FREE state may be computed for each slot S as:

$$T_s = BFD\ \mu s + (S-1)\ T_x \mu s$$

where: BFD is the BUS FREE DELAY of the SCSI specifications (0.8) and $T_x$ is the constant incremental delay per slot, approximately 1 μs for example. In other words, the delay before beginning arbitration for a first slot (S=1) would be 0.8 μs (BFD), for a second slot (S=2) would be 1.8

μs, for a third slot (S=3) would be 2.8 μs, etc. Each disk drive requiring arbitration would randomly select among the defined slots in a manner independent of all other devices. Each disk drive then waits an appropriate delay period $T_s$ before beginning arbitration. However, if a drive randomly selects a slot K in which to arbitrate, but detects a BUS BUSY (not FREE) state before slot K begins arbitration, then the device has already lost arbitration to another device arbitrating in a lower slot number (independently and randomly selected by the other device). The drive(s) in slot K have then lost arbitration, without ever competing therein, and must relinquish control until the next opportunity for arbitration.

The drives are configured to randomly select from a subset of the possible slots with a probability assigned to each. Through configuration of the probabilities, various statistical solutions may be derived which improve the fairness of the arbitration methods over the priority based standards of SCSI 2 specifications. In addition, the number of slots may be reduced to minimize the maximum delay before starting arbitration and need never be larger than the number of drives on the bus.

In a first preferred embodiment, up to seven devices are configured to randomly select from four slots based upon a set of heuristically derived probabilities. In a second preferred embodiment, up to fourteen devices are configured to randomly select from 5 slots based upon a set of heuristically derived probabilities. The pseudo-random selection of arbitration slots in accordance with the present invention may be implemented either as control software/hardware within the SCSI device (customizing and extending the SCSI standards implemented therein), or may be implemented in interface circuits in a mounting device in which the SCSI device is mounted and through which the device is connected to the SCSI bus.

It is therefore an object of the present invention to provide arbitration methods which improve the fairness of SCSI bus allocation.

It is a further object of the present invention to improve performance of a SCSI based subsystem by using arbitration methods which improve the allocation of a bus within the subsystem.

It is still a further object of the invention to improve SCSI bus allocation fairness in a RAID storage subsystem.

It is another object of the present invention to provide SCSI bus arbitration methods within a RAID subsystem which performs bus arbitration based upon probabilistic distribution of bus allocation to disk drive in the subsystem.

It is still another object of the present invention to provide SCSI bus arbitration methods within a RAID subsystem which performs bus arbitration based upon pseudo-random selection of arbitration time slots each shared by one or more devices on the SCSI bus.

It is yet another object of the present invention to provide control methods operable within SCSI devices to improve arbitration fairness by performing bus arbitration using pseudo-random selection methods.

It is still yet another object of the present invention to provide a mounting device for connecting a SCSI device to a SCSI bus which implements improved arbitration fairness by performing pseudo-random selection methods on behalf of a SCSI device mounted therein.

The above and other objects, aspects, features, and advantages of the present invention will become apparent from the following description and the attached drawing.

DETAILED DESCRIPTION OF THE PREFERRED EMBODIMENT

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

SCSI ARBITRATION OVERVIEW

Figure 1:
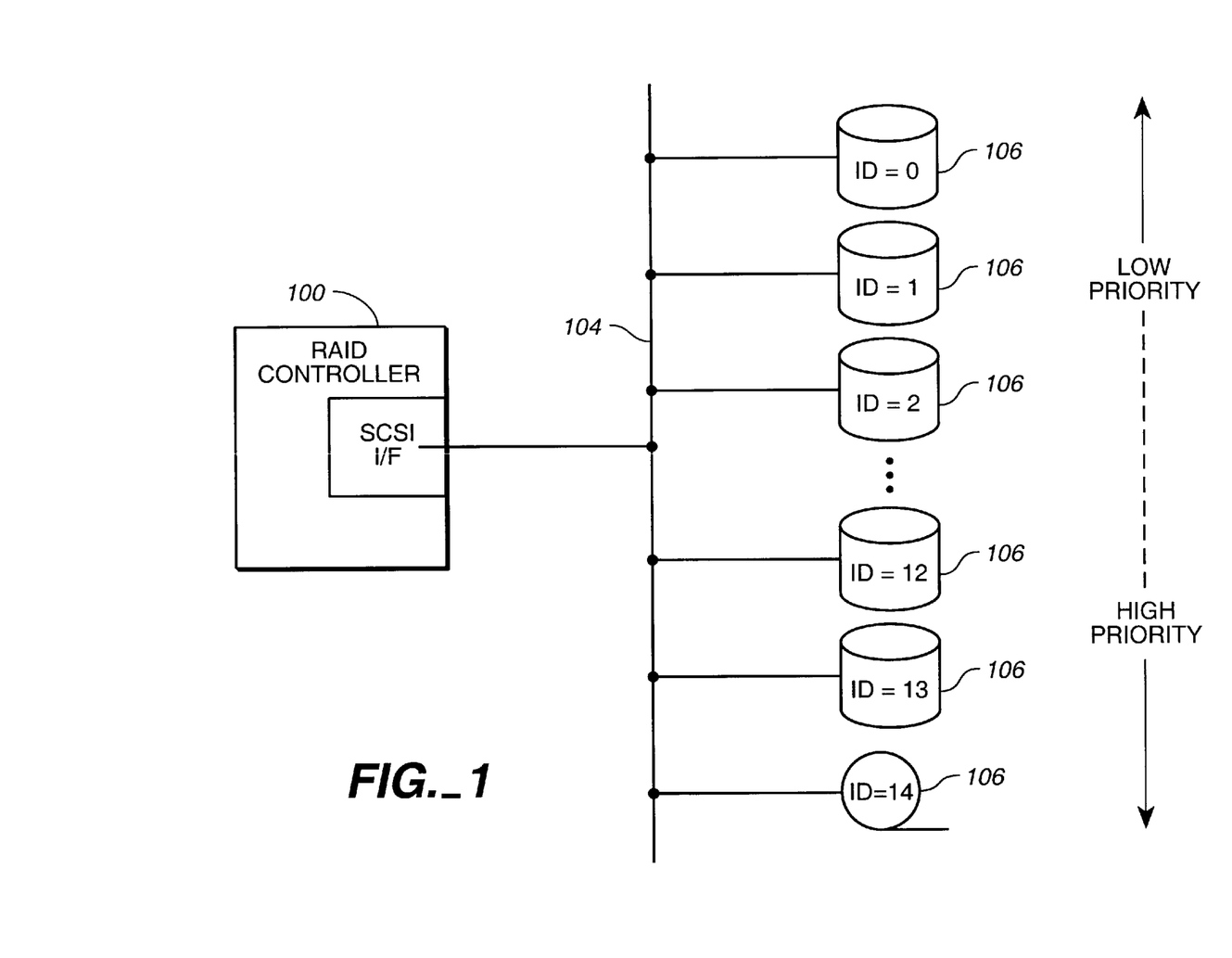
FIG. 1 is a block diagram of a typical SCSI bus application in which the methods and apparatus of the present invention may be advantageously applied.

FIG. 1 depicts a typical SCSI bus in which a plurality of devices 106 and 108 are attached to a common SCSI bus 104. A SCSI interface 102 within, for example, a RAID controller 100 also connects to the SCSI bus 104 to direct storage read and write requests to the various devices 106 and 108. As shown in FIG. 1 each device has an associated unique device ID associated therewith in accordance with the SCSI standards (ranging from 0 through either 7 or 15). A priority is associated with each device in accordance with the device's ID. An ID value of zero is the lowest priority while the highest ID value (7 or 15) has the highest priority associated therewith. As noted in FIG. 1, SCSI devices may be a heterogeneous mix of device types including, for example, disk drives 106 and tape drive 108.

As is known in RAID control technology, the set of disk drives 106 may be grouped into one or more logical sets often referred to as logical units or LUNs. Each LUN may be managed in accordance with any of several RAID storage management levels. Each storage management level controls a plurality of disk drives 106 in a manner to improve reliability as compared to a single disk drive of similar capacity. In addition, as is known in the RAID arts, data may be distributed over a plurality of disk drives mapped by the RAID controller in such a way as to appear (to a host computer system) as a single logical storage devices having larger capacity (in addition to enhanced reliability).

When a SCSI device (106 or 108), a target device, is directed to perform a specific operation by an initiator device it is common that the device will "disconnect" from the SCSI bus to permit other I/O operations to proceed involving other SCSI devices while the specific operation is completed by the disconnected device. When the disconnected device eventually completes the specific operation, it attempts to "reconnect" to the SCSI bus to return any required information to the initiator device. When the disconnected target device is ready to reconnect, it may find that other devices simultaneously require reconnection to the bus. For example, if the bus is busy when the target device is ready to reconnect, then it must await the bus returning to a free state. During this waiting period for the bus to return to a free state, other disconnected devices may complete their respective operations and all will simultaneously require reconnection to the SCSI bus.

The SCSI bus specifications call for such conditions to be arbitrated based upon the priority of the devices on the SCSI bus which require control of the bus. Specifically, each device has a unique SCSI ID associated therewith. Higher SCSI ID values have priority in such arbitration over lower priority, lower value SCSI ID devices.

Under heavy bus utilization conditions, the low priority devices will consistently lose arbitration to the higher priority devices and therefore suffer long delays in reconnecting and completing their respective operations. In a SCSI bus application which has a heterogeneous mix of SCSI devices for different purposes this prioritized arbitration may suffice. However, the in many SCSI bus applications such as RAID disk arrays, this prioritized approach may limit overall I/O performance.

In high performance RAID storage subsystems, a plurality of RAID controllers may be simultaneously performing operations on a common SCSI bus on behalf of multiple host generated I/O requests. RAID controllers which happen to request operations on lower priority SCSI devices on a particular SCSI bus may suffer delays as other RAID controllers request operations on higher priority SCSI devices on the same SCSI bus. The unfairness of bus allocation due to the priority based arbitration is particularly serious in higher performance RAID subsystems in which multiple controllers manipulate up to fourteen devices on common SCSI busses.

The extent of the potential performance problem can be measured by comparing the average reconnection delay for SCSI devices having different priorities to the average delays where the SCSI arbitration is modified to be perfectly fair (e.g., without priorities according to a statistical model).

STATISTICAL MODEL

Before presenting the methods and apparatus of the present invention, a statistical model useful for performance analysis of the problem is herein presented. This model is intended as background material to aid in understanding the purpose and overall techniques of the present invention and is not to be construed as limiting the scope of the present invention.

Multiple target device arbitration on a SCSI bus can be modeled as an M/M/1 non-preemptive priority, also referred to as an M/M1/HOL (head of line) queue. Such queues are discussed in detail in a paper by A. O. Allen entitled *Elements of Queuing Theory for System Design* (IBM Systems Journal, No. 2, 1975). From this paper we can derive the following expression for the mean reconnection delay for an I/O operation in a SCSI device:

$$D_{PRI} = u\, T_s / ((1 - Pu/N_D)\, [1 - u(P-1)/N_D])$$

where u is the SCSI bus utilization as a percentage of time the bus is busy, $T_s$ is the average SCSI bus service time per I/O operation (bus transfer time plus bus overhead), $N_D$ is the number of devices on the bus, and P is the priority for the particular device (where P=1 is the highest priority). For M/M/1/HOL queues, the I/O operations are assumed to have exponentially distributed bus service times and therefore the mean and standard deviation of the bus service times are the same, namely $T_s$. Also, since bus service time is approximately proportional to the operation's I/O size, the I/O sizes are assumed to be approximately distributed exponentially with nearly equal mean and standard deviation.

For additional simplicity in the model, all I/O requests are assumed to be read requests generated by the array controller(s) randomly over time, at a constant average rate, and issued in equal average proportions to all of the drives on the bus. The controller(s) on the bus always have a higher priority than the devices in the above model and so can always issue an I/O operation request to any of the other devices. The drives are assumed to accept any number of such I/O requests and to have infinite buffer space so as to allow I/O requests to queue within a device for bus access and reselection.

The model may be modified to express the reconnection delays expected under a fair arbitration without priority. The reconnection delay under such a fair model may be expressed as:

$$D_{FAIR} = u\, T_s / (1 - u)$$

where u and $T_s$ are as explained above.

According to Little's theorem, this expression is unchanged if the M/M/1 queuing discipline is FIFO (first in first out) or SIRO (selected in random order). Only the standard deviation of the reconnection delay times differ due to the queuing discipline employed.

While there are some differences between the above assumptions and the real world of disk array control, the model is believed to provide an accurate enough understanding to aid in explaining the methods and apparatus of the present invention. As noted above, the assumptions stated above are intended simply to express one possible model for understanding the overall techniques and measures behind the methods of the present invention. They are not intended to limit the scope of protection of the methods and apparatus of the present invention.

Figure 2:
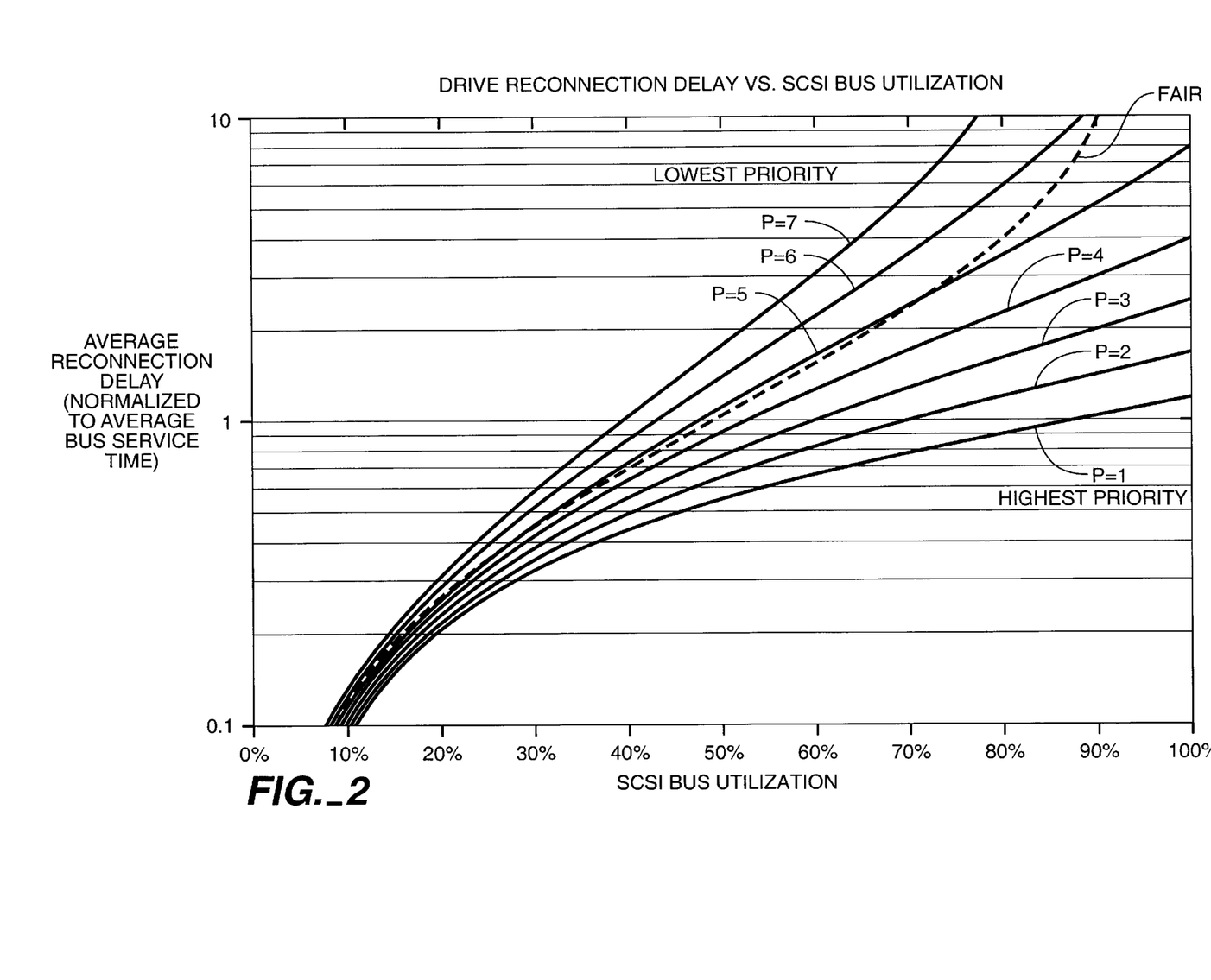
FIG. 2 is a graph depicting average SCSI device reconnection delay for a seven device bus configuration and an average (fair) delay time.
Figure 3:
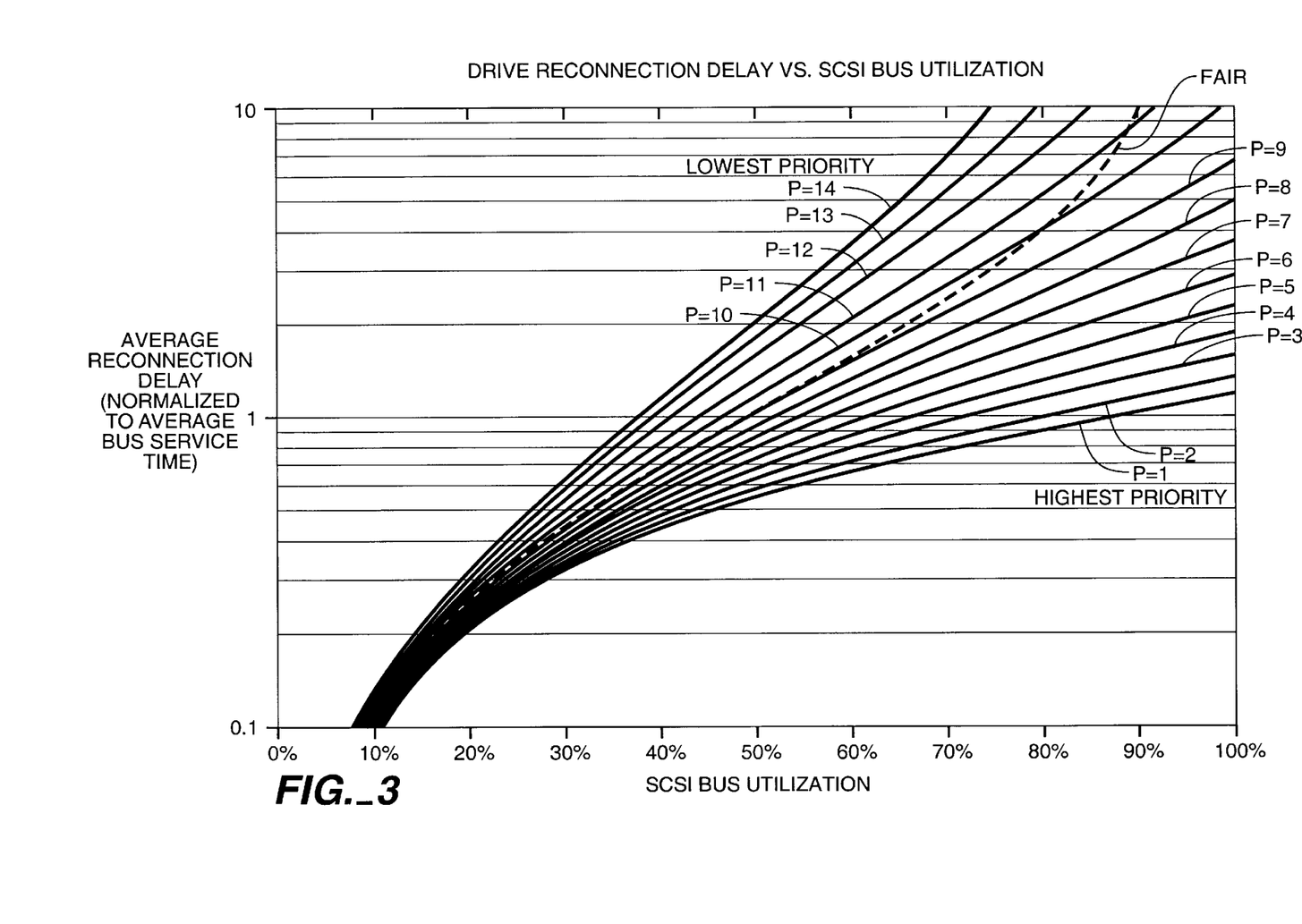
FIG. 3 is a graph depicting average SCSI device reconnection delay for a fourteen device bus configuration and an average (fair) delay time.

Using the above models, one can compute the reconnection delay times in both a priority based arbitration model and in a fair (non-priority) arbitration model. FIGS. X an Y present graphs of the delay time for each device on a SCSI bus as a function of the bus utilization. FIG. 2 presents the delay times for each device on a SCSI bus having seven devices while FIG. 3 presents the delay times for each of fourteen devices on a SCSI bus. The X axis in each figure is the SCSI bus utilization as a percentage of time the bus is busy. The Y axis in each figure is a logarithmic scale of the average reconnection delay time computed in accordance with the priority based arbitration model presented above normalized to the average bus service time as a value of 1. That is to say a value of 1 on the Y axis means that, on average, a device spends as much time waiting for the SCSI bus as it does using the SCSI bus to transfer information in an I/O operation. Likewise, a value of 10 indicates that, on average, the device spends ten times as much time waiting for the SCSI bus as it does transferring information, etc.

Each solid line plotted on the graphs of FIGS. 2 and 3 represent the average, normalized reconnection delay ($D_{PRI}$) for a device with priority value as indicated on the graph (i.e., 1 through 7 for FIG. 2 and 1 through 14 for FIG. 3) in a priority based arbitration method as defined by SCSI specifications. The dashed line plotted on each graph represents the reconnection delay ($D_{FAIR}$) for each of the devices for a perfectly fair arbitration method. In this latter case of perfectly fair arbitration, each device has the same average reconnection delay time ($D_{FAIR}$).

These charts confirm the intuitive notion that the highest priority device will have the least delay in reconnection and that other devices will have increasing delay times as their relative priority decreases. Furthermore, these figures confirm the observation that as SCSI utilization increases, the reconnection delays increase for all devices with the higher priority device delays increasing slower than the lower priority device delays.

The delay curves are nearly the same in both charts (FIGS. 2 and 3). However, it will be noted that the delays depicted in FIG. 3 (having fourteen devices) as opposed to those of FIG. 2 (having seven devices) are more spread. That is the delays for the higher priority devices in a fourteen device system are decreased somewhat slightly from the higher priority devices of a seven device system while the delays for the lower priority devices in a fourteen device system increase slightly from the lower priority devices of the seven device system. The dashed line in both FIGS. 2 and 3, corresponding to the average delay time for perfectly fair arbitration in both seven and fourteen device systems, is approximately equal.

Another result observed in the graphs of FIGS. 2 and 3 is that the number of devices which do better than the average (shorter delay times than the average dashed line curve) increases as SCSI bus utilization increases. This effect is most clearly observed in the fourteen device system of FIG. 3. At 50% SCSI bus utilization (along the X axis of FIG. 3), the eight highest priority devices have "good" delay times (shorter than the average delay time dashed line curve) while the 6 lowest priority devices have "bad" delay times (longer than the average delay time dashed line curve). However, at 70% SCSI bus utilization in FIG. 3, the curves shift relative to the average delay time curve such that the 9 highest priority devices are "good" while only the lowest 5 priority devices are "bad." At 90% SCSI bus utilization of FIG. 3, the shift in the curves is even more dramatic with the 10 highest priority devices "good" and only the 4 lowest priority devices "bad." In theory of course, only the lowest priority device asymptotically approaches infinite delay at 100% SCSI bus utilization. Since the dashed line average delay time curve of FIG. 3 (the perfectly fair arbitration for $D_{FAIR}$) is the average of the delay times of all fourteen devices, it too has infinite delay time at 100% SCSI bus utilization. In other words, both the delay time curve for the lowest priority device and the average curve for all devices have a mathematical singularity at 100% SCSI bus utilization.

One of ordinary skill in the art could recognize that the variable delay times for a standard priority based arbitration scheme may be advantageously applied to particular environments. For example, in certain SCSI bus applications, it may be possible to segregate larger I/O requests from smaller ones and to assign the larger I/O requests to the low priority devices. By amortizing the longer arbitration delay times over larger I/O requests (which then occupy the SCSI bus for longer transfer periods), the mean bus waiting time per I/O request may be reduced. In practice, such prioritization of I/O requests is difficult if not impossible to impose on the host based storage applications.

Priority based arbitration therefore has inherent disadvantages in typical storage applications of a SCSI bus. First, certain devices or groups of devices on the bus give consistently inferior performance relative to other devices or groups under heavy SCSI bus utilization. Second, the performance of disk arrays with multiple ranks of RAID level 3 or RAID level 5 groups will be dictated by the performance of the lower priority devices and not by the average of all devices. As noted above in FIGS. 2 and 3, at 50% SCSI bus utilization, the lowest priority devices have nearly twice the average delay time while at 70% SCSI bus utilization, this factor increases to three.

PRESENT METHODS FOR FAIR ARBITRATION

The present invention provides for fairer SCSI bus arbitration by extending the arbitration period on the SCSI bus (in accordance with allowed parameters of the SCSI bus specifications) and enabling a random selection among the SCSI devices for a time within the extended period in which to attempt arbitration. In particular, the SCSI specifications require a devices to begin arbitration any time after 0.8 $\mu$s (i.e., the SCSI BUS FREE DELAY) following its detection of the BUS FREE state. The SCSI standard goes on to suggest that a device wishing to arbitrate for control of the SCSI bus wait no longer than about 1.8 $\mu$s after detecting the BUS FREE state or risk losing arbitration to faster arbitrating devices. In the standard SCSI arbitration, it is always assured that the highest priority device will win the arbitration. This is in fact the definition of the priority based arbitration in the SCSI specification.

The methods of the present invention provide for each device requiring arbitration to begin at some random time delay increment (plus the minimum BFD $\mu$s) after its detection of the BUS FREE state. Prior to starting arbitration, each device which requires arbitration randomly selects one of the pre-defined time slots to determine its time delay before beginning arbitration. The device then delays an amount of time following detection of the BUS FREE state in accordance with the randomly selected time slot. When the device starts arbitration in the randomly selected time slot, it is possible that another device has already won control of the bus by arbitrating in an earlier randomly selected time slot. In other words, arbitration takes place among the devices which randomly select the same time slot. All devices which randomly select earlier time slots win arbitration over all devices which randomly select later time slots. Conversely, devices which select later time slots for arbitration will lose arbitration to all devices which randomly select earlier time slots. In this manner, the arbitration methods of the present invention are fair as compared to standard priority based arbitration methods.

Figure 4:
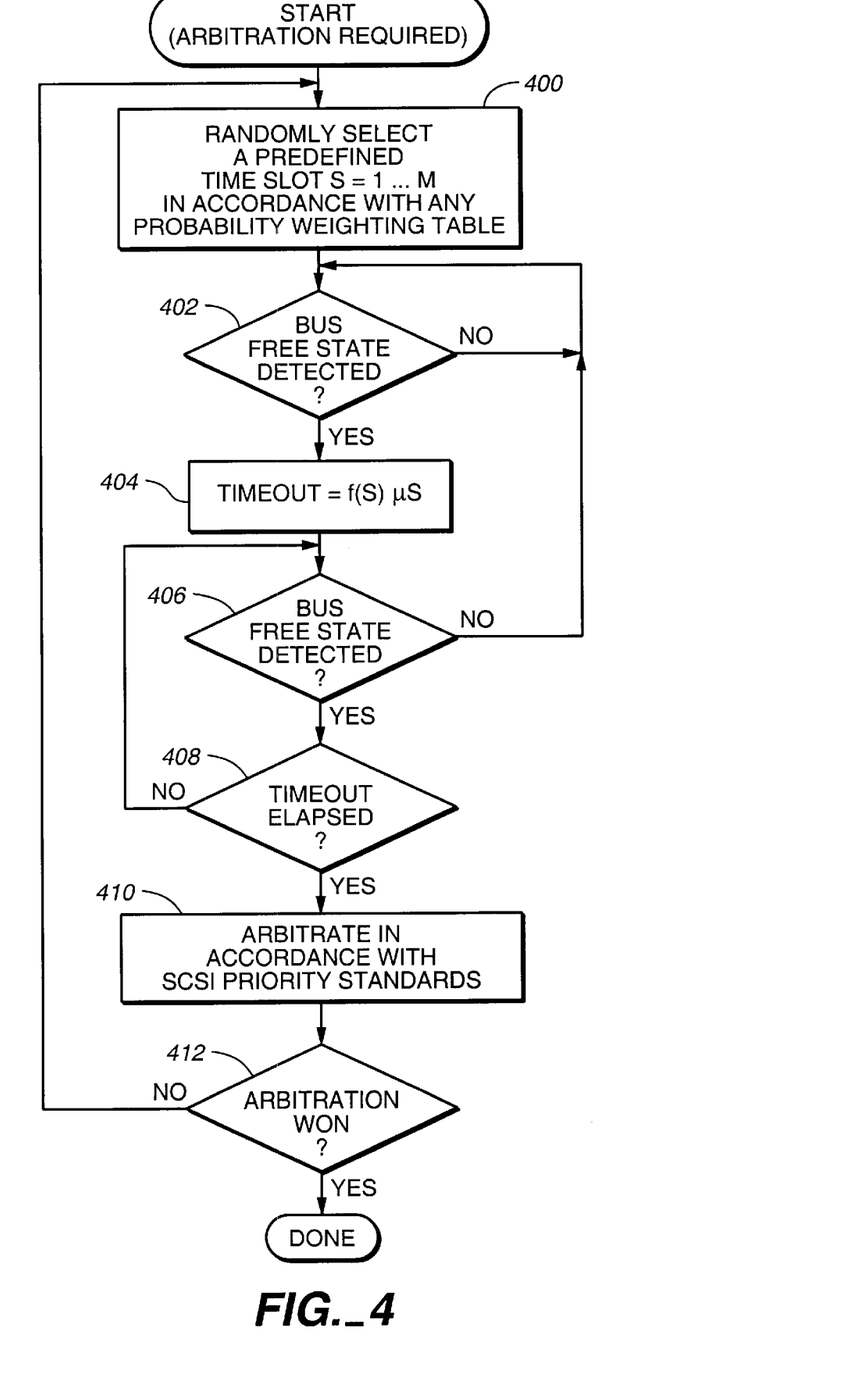
FIG. 4 is a flowchart describing the methods of the present invention to provide improved fairness in the reconnection delays associated with SCSI bus arbitration.

The arbitration method of the present invention is depicted in the flowchart of FIG. 4. In a first preferred embodiment, the method of FIG. 4 is operable within the control software/firmware of a SCSI device. As noted above, typical SCSI storage devices operate as a target device to receive an I/O operation request from an initiator device (e.g., the RAID controller). The target device then disconnects from the SCSI bus while performing initial portions of the requested I/O operation (e.g., seeking to the addressed block of the storage device). While the target device is disconnected, other SCSI bus operations may be initiated to other targets which may in turn disconnect as they prepare to perform their respective I/O operations. When the target device has sufficiently completed the I/O operation initialization it attempts to reconnect to the initiator device on the SCSI bus. To reconnect, the SCSI bus must be in the BUS FREE state. It is possible that the SCSI bus will not be free when the target device is ready to reconnect. In such a case, the target device must wait for the bus to return to a free state. During this wait period it is possible that other target devices will have completed their respective I/O operation initialization processing. Therefore, a number of devices may be prepared to reconnect to the SCSI bus at the next BUS FREE state.

The method of FIG. 4 is therefore operable when a device determines that it is necessary to arbitrate to obtain control of the SCSI bus and thereby reconnect to complete an I/O operation. Element 400 is first operable to randomly select one of M defined time slots (identified by an index value such as 1 . . . M) in accordance with the predefined probability matrix (discussed below) for the subsystem. Each of the M time delay slots corresponds to a pre-defined time delay period to precede arbitration for the SCSI bus following detection of the next BUS FREE state. Pseudo-random selection techniques based upon random number generation methods are well known to those of ordinary skill in the art. Weighting techniques applicable to such pseudo random selections based upon a probability matrix (discussed below) are also known to those of ordinary skill. To further improve the random distribution of time slot selection of time slots among several devices, each device should be initialized to randomly select time slots independent from the random selections of other devices.

Element 402 is then operable to await detection of the next BUS FREE state on the SCSI bus. Following detection of the next BUS FREE state, element 404 is operable to initialize a time-out value to the delay value associated with the selected time slot. As noted above, the time delay $T_s$ associated with each time slot may be determined as a function of the pseudo randomly selected slot (denoted f(S) in element 404). The best presently known mode for implementing determining the time delay associated with each slot is:

$$T_s = BFD\ \mu s + (S-1)\ T_x \mu s$$

where: BFD is the SCSI specified minimum BUS FREE DELAY time and $T_x$ is the constant incremental delay per slot, approximately 1 $\mu$s for example. One of ordinary skill in the art will readily recognize that $T_x$ may be tuned for a particular environment to reduce the maximum delay time in arbitration. The value of $T_x$ must be sufficiently long to permit earlier arbitration (in time slots having shorter delays) to complete.

Elements 406 and 408 are then operable iteratively to delay the pre-defined time out value while the SCSI bus remains in the BUS FREE state. Element 406 terminates the iterative operation of elements 406 and 408 if the SCSI bus returns to a busy state (not BUS FREE) during the time-out delay period. If the bus becomes busy, another device has already won arbitration without allowing the present device to compete for the bus. Processing then continues in the present device by looping back to element 402 to await the next BUS FREE state on the SCSI bus. So long as the SCSI bus remains in the BUS FREE state, element 408 is next operable to await expiration of the delay period determined by element 404. Until the time-out period expires, element 408 is operable to continue processing by looping back to element 406.

Following expiration of the pre-defined time delay period associated with the randomly selected time slot, element 410 is then operable to perform standard SCSI arbitration. Only those devices which randomly selected the same time slot will participate in this arbitration for the SCSI bus. Other devices which selected time slots associated with longer delay periods are delayed until after the arbitration completes. Such other devices will then lose arbitration (though they never actually compete in the present arbitration cycle) and will attempt arbitration again at a next BUS FREE state.

Element 412 determines whether the present device won the arbitration cycle performed by operation of element 410. If so, processing for this device is completed and it completes its I/O operation by reconnecting to the initiating device. If the present device lost the SCSI bus arbitration cycle to another device competing in the same selected time slot, then processing continues by loping back to element 402 to await another BUS FREE state.

The winner of such randomized arbitration will not always be the highest priority device (as defined by the SCSI ID priority). Rather, the winner will be the highest priority device among those randomly selecting the shortest delayed period for arbitration (the lowest time delay slot). This method of the present invention allows for fair distribution of the SCSI bus to each of the SCSI devices on the bus. All devices on the SCSI bus will then perform equally with an average delay time of $D_{FAIR}$ as noted above with respect to FIGS. 2 and 3.

The incremental delay $T_x$ associated with each time slot must be kept reasonably small. The time increment must be sufficiently long to permit each drive to detect a busy state resulting from arbitration in an earlier time slot but short enough to reduce the maximum extension of delay time in the arbitration cycle. An incremental delay value of 1 $\mu$s is the best presently known value to balance these competing requirements.

In addition, it is desirable to further reduce the maximum additional delay time imposed by methods of the present invention during SCSI bus arbitration cycles. The maximum number of time slots defined determines the maximum time delay increment by which the arbitration delay period is extended.

SLOT PROBABILITY MODEL

For a given number of SCSI devices (N) and a given number of time delay slots (M), a matrix of N×M probabilities may be constructed to modify the pseudo-random selection of the method discussed above with respect to FIG. 4. For example, the table below generally represents such a probability matrix:

| Device Priority J | Slot 1 | Slot 2 | Slot 3 | . . . | Slot M |
|---|---|---|---|---|---|
| 1 | $P_{11}$ | $P_{12}$ | $P_{13}$ | . . . | $P_{1M}$ |
| 2 | $P_{21}$ | $P_{22}$ | $P_{23}$ | . . . | $P_{2M}$ |
| 3 | $P_{31}$ | $P_{32}$ | $P_{33}$ | . . . | $P_{3M}$ |
| N | $P_{N1}$ | $P_{N2}$ | $P_{N3}$ | . . . | $P_{NM}$ | where: $P_{JS}$ is the probability that a device having SCSI priority J will attempt arbitration in Slot S. By choosing suitable values for the number of slots M and the probabilities $P_{JS}$ for each device and for each slot, we can create a table which may be used to modify the pseudo-random selection described above with respect to element 400 of FIG. 4. Specifically, the pseudo-random selection operation of element 400 above can select among those slots in the row of the table corresponding to the particular device which have a non-zero probability value. Specifically, the selection process of element 400 selects among the several slots randomly but with a frequency of selecting each slot in proportion to its probability value. The probability value in each column of the device's row may be any value between zero and one and the sum of the probabilities across a particular device's row should sum to one. Use of the probability table in this manner by element 400 above modifies the pseudo-random selection process by weighting the random process according to the probability values of the table.

Selection of particular probability values in such a matrix so as to optimize storage subsystem performance is a non-trivial matter. It involves solution of a system of N non-linear equations involving M unknowns subject to the constraints that each probability value lies in the range zero to one and the sum across any row must be one. Simplistic solutions such as uniformly distributed probability across each row produce poor performance results as does making the probabilities in each column the same. Some statistical observations provide a basis for a heuristic method of determining preferred (though not necessarily optimum) value to improving the overall performance of the storage subsystem.

Before attempting to tune or optimize the slot probability matrix it is useful to analyze the probability of arbitration being required to acquire control of the SCSI bus. This probability must be determined in view of the number of devices which may require arbitration, the number of items in the queue and the number of items presently in service from the queue. If the arbitration process is fair, as described above, then the following expressions from M/M/1 queuing theory are applicable in the determination of the probability of k devices requiring arbitration where u is the bus utilization, $N_Q$ is the number of items in the queue, and N is the total number of items in the queue and presently in service:

$$P(N=k)=(1-u)u^k, \text{ for } k>=0$$

$$P(N>=k)=u^k, \text{ for } k>=0$$

$$P(N_Q=0)=P(N=0)+P(N=1)=1-u^2$$

$$P(N_Q=k)=P(N=k+1)=(1-u)u^{k+1}, \text{ for } k>=1$$

$$P(N_Q>=k)=P(N>=k+1)=u^{k+1}, \text{ for } k>=1$$

As applied to the present storage environment, the probability that arbitration occurs (with one or more target devices on the SCSI bus), just as the bus goes to the BUS FREE state, is equal to the probability that there are one or more I/O operation in the queue waiting for reconnection to their respective initiator device. Using the above expressions, this probability $P_A$ may be expressed as:

$$P_A=P(N_Q>=1)=u^2$$

The probability that just one device would require arbitration (without competition for the SCSI bus) at the transition to SCSI BUS FREE is further a function of the above probability time the probability that all requests in the queue are directed to a single device. Assuming random distribution of I/O requests across all devices, this additional probability factor is a standard function of the number of devices. The probability of a single device arbitrating for the bus $P_{A1}$ may then be expressed as:

$$P_{A1} = P(N_Q = 1) + P(N_Q = 2)P(2 \text{ requests on same device}) +$$
$$P(N_Q = 3)P(3 \text{ requests on same device}) + \ldots =$$
$$(1-u)u^2 + (1-u)u^3(1/N_D) + (1-u)u^4(1/N_D)^2 + \ldots =$$
$$(1-u)u^2(1 + (u/N_D) + (u/N_D)^2 + \ldots)$$

Algebraic simplification of the series then reveals:

$$P_{A1}=((1-u)u^2)/(1-u/N_D)$$

The probability that arbitration will be required with two or more devices competing for the SCSI bus ($P_{AM}$) is simply the probability of arbitration occurring with any number of devices ($P_A$) minus the probability of arbitration with exactly one device ($P_{A1}$), or specifically:

$$P_{AM}=P_A-P_{A1}$$

The probability of arbitration occurring with exactly two devices ($P_{A2}$) is therefore:

$$P_{A2} = P(N_Q = 2)P(2 \text{ requests on 2 devices}) +$$
$$P(N_Q = 3)P(3 \text{ requests on 2 devices}) +$$
$$P(N_Q = 4)P(4 \text{ requests on 2 devices}) + \ldots =$$
$$(1-u)u^3(1-1/N_D) + (1-u)u^4(3/N_D)(1-1/N_D) +$$
$$(1-u)u^57(1/N_D)^2(1-1/N_D) + \ldots$$

Algebraic simplification of the series then reveals:

$$P_{A2}=(1-u)u^3(1-1/N_D)(2/(1-2u/N_D)-1/(1-u/N_D))$$

Figure 5:
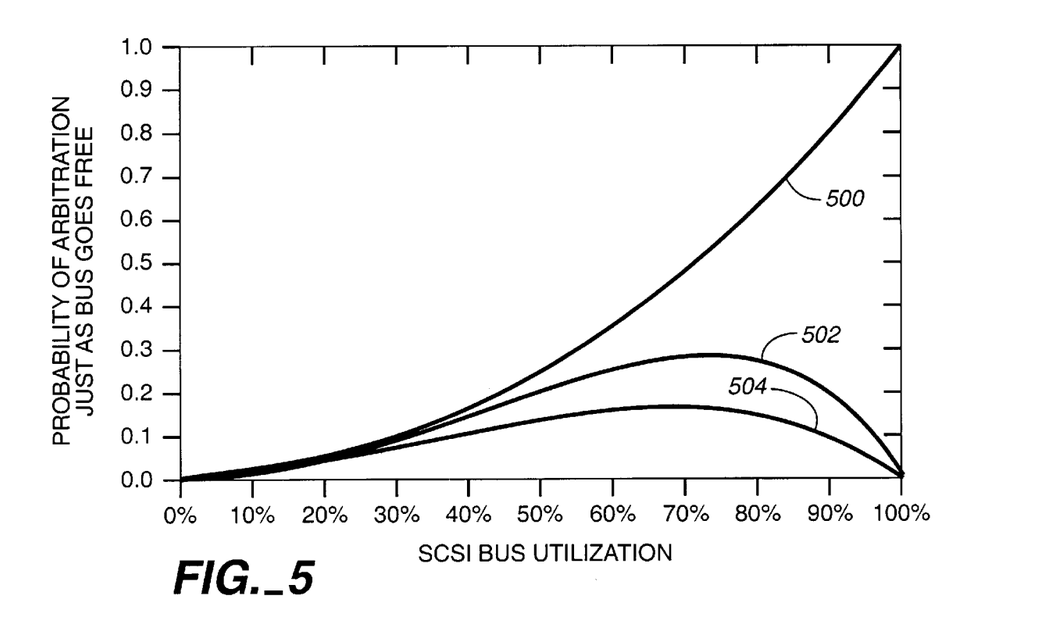
FIG. 5 is a graph depicting probability of bus arbitration occurring in a seven device system as a function of bus utilization.

Further analysis can determine similar probabilities for other numbers of arbitrating drives. FIG. 5 is a graph depicting these probabilities along the Y axis as a function of the SCSI bus utilization (u) along the X axis for a seven device subsystem. Curve 500 of FIG. 5 depicts the probability of any number of devices arbitrating ($P_A$) as a function of SCSI bus utilization (u). Curve 502 is the plot of the probability of one or two devices arbitrating on the bus ($P_{A1}+P_{A2}$) while curve 504 is the plot of arbitration with exactly one device arbitrating ($P_{A1}$) without competition for the bus). Curves 600, 602, and 604 of FIG. 6 depict the same information as curves 500, 502, and 504 of FIG. 5, respectively, but for a subsystems with fourteen SCSI devices on the bus.

Figure 6:
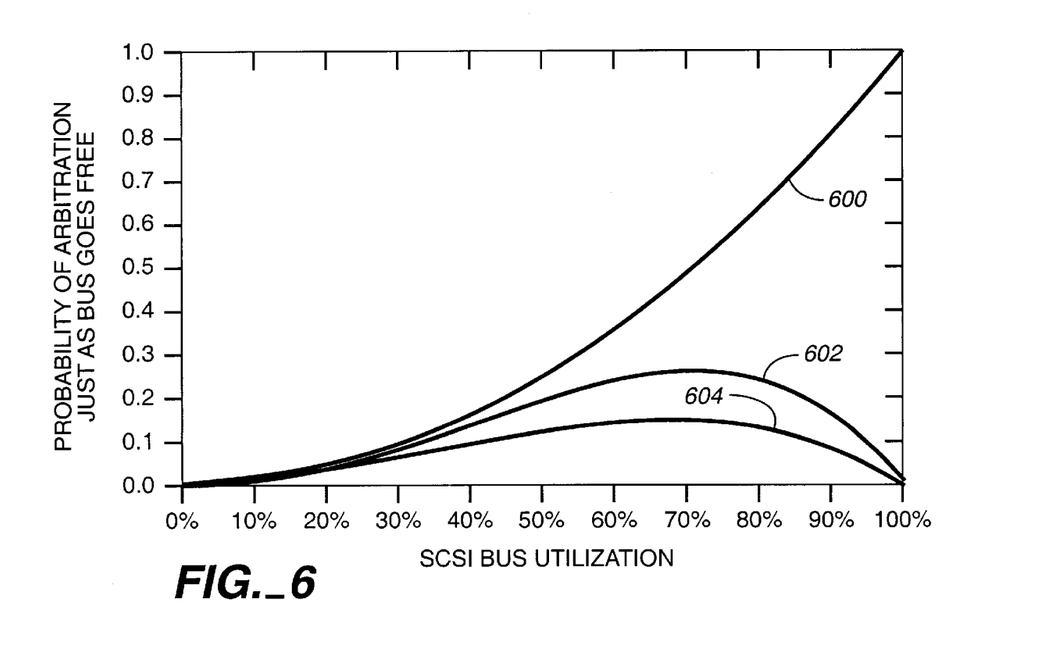
FIG. 6 is a graph depicting probability of bus arbitration occurring in a fourteen device system as a function of bus utilization.

As can be observed from the graphs of FIGS. 5 and 6, at up to about 70% SCSI bus utilization, the majority of arbitrations involve 1 or 2 devices arbitrating for control of the SCSI bus. In most practical SCSI bus subsystem applications, utilization is maintained well below 70% by design to meet other performance criteria. Thus the graphs of FIGS. 5 and 6 suggest that if all 1 device (1-way) and 2 device (2-way) arbitrations could be made fair, then the majority of all arbitrations could be made fair to thereby enhance overall subsystem performance as discussed above. Of course, 1-way arbitrations are, by definition, fair since there is no competition for the bus. Therefore, in seeking to improve fairness, attention paid to improving fairness in 2-way arbitrations is most beneficial.

ACHIEVING PERFECT 2-WAY ARBITRATION FAIRNESS

For purposes of discussing perfect fairness, a simple exemplary case is preferred. The simplest case of arbitration is when there are exactly two devices on a SCSI bus (demoted by their respective priority numbers J=1,2). The number of time delay slots required is at least M=2 (M=1 is the standard SCSI bus architecture in which all devices simultaneously arbitrate and the highest priority device always wins).

In such a situation, the lower priority device (J=2) wins arbitration over the higher priority device (J=1) only when the lower priority device randomly selects the shorter time delay slot S=1 and the higher priority device selects the longer time delay slot S=2. In other words, in a priority matrix have 2 devices and 2 time delay slots, the probability that device 2 wins arbitration over device 1 (denoted $P_{2W1}$) is:

$$P_{2W1}=P_{21}P_{12}$$

Assuming $P_{2W1}$ must be ½ to achieve perfect fairness, there are several solutions to the determination that:

$$P_{21}P_{12}=\tfrac{1}{2}$$

A simple solution is:

$$P_{12}=1, P_{21}=\tfrac{1}{2}$$

which results in a probability matrix of:

| Device Priority J | Slot 1 | Slot 2 |
|---|---|---|
| 1 | $P_{11} = 0$ | $P_{12} = 1$ |
| 2 | $P_{21} = .5$ | $P_{22} = .5$ |

Extending this analysis to 3 devices we find that M=2 time delay slots is insufficient to achieve perfect 2-way fairness in all arbitrations. Specifically, such a matrix would require:

$$P_{2W1}=P_{3W1}=P_{3W2}=\tfrac{1}{2}, \text{ and}$$

$$P_{21}P_{12}=P_{31}P_{12}=P_{31}P_{22}=\tfrac{1}{2}, \text{ which implies that}$$

$$P_{12}=P_{22}=1-P_{21}, \text{ and}$$

$$P_{21}P_{12}=P_{21}(1-P_{21})=\tfrac{1}{2}$$

But this last equation cannot be satisfied since:

$$P(1-P)<=\tfrac{1}{4} \text{ for any probability values of } P.$$

Therefore we find that to achieve perfect 2-way fairness for a three device SCSI subsystem we need at least M=3 time delay slots. With three time delay slots, we require for perfect fairness that:

$$P_{2W1}=P_{21}(P_{12}+P_{13})+P_{22}P_{13}=\tfrac{1}{2}, \text{ and}$$

$$P_{3W1}=P_{31}(P_{12}+P_{13})+P_{32}P_{13}=\tfrac{1}{2}, \text{ and}$$

$$P_{3W2}=P_{31}(P_{22}+P_{23})+P_{32}P_{23}=\tfrac{1}{2}$$

As above, many possible solutions exist to this set of simultaneous equations. However one simple solution suggested by the previous solution is:

| Device Priority J | Slot 1 | Slot 2 | Slot 3 |
|---|---|---|---|
| 1 | $P_{11} = 0$ | $P_{12} = 0$ | $P_{13} = 1$ |
| 2 | $P_{21} = 0$ | $P_{22} = .5$ | $P_{23} = .5$ |
| 3 | $P_{31} = .5$ | $P_{32} = 0$ | $P_{33} = .5$ |

Further analysis reveals that to achieve perfect 2-way fairness for $N_D$ devices would require $N_D$ time delay slots. As in the previous 2 and 3 device examples, a general and simple solution to the simultaneous equations requires that the highest priority device arbitrates with probability of 1 in the longest time delay slot while each other device arbitrates in that same slot with a probability of ½ and one other time delay slot unique from all other devices with a probability of ½.

Problems arise with this approach to achieving perfect 2-way fairness for $N_D$ devices. First, a requirement for $N_D$ time delay slots imposes $N_D-1$ additional time delays in the arbitration process as compared to the standard SCSI (priority based) arbitration methods. These additional time delay slots can significantly affect the overall subsystem throughput by increases in the idle time on the SCSI bus. For example, if the time delay increment is $T_x=1$ µs, then on a seven device, 10 MB/s SCSI bus, the additional 6 µs corresponds to 60 byes of information that could have otherwise been transferred over the SCSI bus. Likewise, on a fourteen device fast/wide SCSI bus the additional overhead amounts to 13 µs which corresponds to 260 byte of information not transferred over the SCSI bus. For large I/O request, this additional overhead may be negligible when amortized over the total transfer throughput. However, on smaller I/O requests, the added overhead/idle time for arbitration may represent a significant negative impact on overall performance.

A second problem with such perfect 2-way arbitration arises in the skew produced between high and low priority device probabilities for higher order arbitrations (e.g., 3-way or 4-way arbitrations). In general, in N-way arbitration (N>2), the lowest priority device arbitrating will win with a probability of ½ while the two highest priority devices will win with only a probability of $(\tfrac{1}{2})^{N-1}$. While these higher order arbitrations are less frequent, and the probability is fairer than the standard SCSI priority based arbitration, this skew is undesirable.

OPTIMIZED NEAR PERFECT 2-WAY ARBITRATION

The above identified problems with perfect 2-way fairness are resolved by the methods and apparatus of the present invention by reducing the number of time delay slots required in seven and fourteen device subsystems while sacrificing some of the performance gains of perfect 2-way fairness. Reducing the number of time delay slots also reduces the skew problem discussed above for higher order arbitrations.

Empirical evidence suggests the following guidelines for producing the best performing arbitration slot selection probabilities for near perfect 2-way fairness in arbitration with the number of time delay slots (M) less than the number of devices ($N_D$):

1. For a number of slots M, let $P_{1M}=1$ and let all other device probabilities of slot M equal ½. In other words, $P_{1M}=1$ and $P_{JM}=\tfrac{1}{2}$ for J=2 . . . $N_D$.
2. Let all other non-zero entries in the probability matrix have a value of ½ (i.e., each device 2 . . . $N_D$ selects from slot M and one other slot), and let the non-zero probability values be balanced as much as possible among the slots S=1 . . . (M−1), and let the slot number S generally not increase as the device priority number J increases from 1 through $N_D$ A slot selection probability matrix constructed in accordance with these guidelines will be optimal in the sense of having the greatest percentage of fair 2-way arbitrations while reducing the skew for higher order arbitrations as compared to perfect 2-way arbitration.

The following slot selection probability matrices, constructed in accordance with the above guidelines, achieve near perfect 2-way arbitration with 4 and 5 slots respectively.

| Device Priority | Slot 1 | Slot 2 | Slot 3 | Slot 4 |
|---|---|---|---|---|
| 1 (highest) | 0 | 0 | 0 | 1 |
| 2 | 0 | 0 | .5 | .5 |
| 3 | 0 | 0 | .5 | .5 |
| 4 | 0 | .5 | 0 | .5 |
| 5 | 0 | .5 | 0 | .5 |
| 6 | .5 | 0 | 0 | .5 |
| 7 (lowest) | .5 | 0 | 0 | .5 |

The above seven device, 4 slot matrix allows for 18 fair 2-way arbitrations of a possible 21. Only 3 of the 2-way arbitrations are biased (less than fair specifically having a ¼ vs. ¾ probability scenario). The added arbitration delay is only due to the added three time delay slots in a seven device SCSI subsystem is only 3 μs or the equivalent of 30 bytes worth of missed data transfer time.

| Device Priority | Slot 1 | Slot 2 | Slot 3 | Slot 4 | Slot 5 |
|---|---|---|---|---|---|
| 1 (highest) | 0 | 0 | 0 | 0 | 1 |
| 2 | 0 | 0 | 0 | .5 | .5 |
| 3 | 0 | 0 | 0 | .5 | .5 |
| 4 | 0 | 0 | 0 | .5 | .5 |
| 5 | 0 | 0 | .5 | 0 | .5 |
| 6 | 0 | 0 | .5 | 0 | .5 |
| 7 | 0 | 0 | .5 | 0 | .5 |
| 8 | 0 | .5 | 0 | 0 | .5 |
| 9 | 0 | .5 | 0 | 0 | .5 |
| 10 | 0 | .5 | 0 | 0 | .5 |
| 11 | .5 | 0 | 0 | 0 | .5 |
| 12 | .5 | 0 | 0 | 0 | .5 |
| 13 | .5 | 0 | 0 | 0 | .5 |
| 14 (lowest) | .5 | 0 | 0 | 0 | .5 |

The above fourteen device, 5 slot matrix allows for 76 fair 2-way arbitrations of a possible 91. Only 15 of the 2-way arbitrations are biased (less than fair specifically having a ¼ vs. ¾ probability scenario). The added arbitration delay is only due to the added four time delay slots in a fourteen device SCSI subsystem is only 4 μs or the equivalent of 80 bytes worth of missed data transfer time.

One of ordinary skill in the art will readily recognize several other similar solutions which construct a slot selection probability matrix to provide for near perfect 2-way arbitration, while reducing the number of time delay slots to less than the number of devices ($N_D$).

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a system including a bus and at least one device attached thereto requiring control of said bus, a method for implementing bus arbitration comprising the steps of:
   a) pseudo-randomly selecting one time slot of a plurality of time slots wherein each of said plurality of time slots is associated with a delay period before arbitration begins;
   b) awaiting a BUS FREE state on said bus;
   c) after step b), delaying arbitration by said device until expiration of the delay period associated with the selected time slot; and
   d) arbitrating for said bus on behalf of said device.

2. In a system including a bus and at least one device attached thereto requiring control of said bus, a method for implementing bus arbitration comprising the steps of:
   a) pseudo-randomly selecting one time slot of a plurality of time slots wherein each of said plurality of time slots is associated with a delay period before arbitration begins;
   b) awaiting a BUS FREE state on said bus;
   c) delaying arbitration by said device until expiration of the delay period associated with the selected time slot;
   d) arbitrating for said bus on behalf of said device; and
   repeating steps b) and c) in response to detection of a BUS BUSY condition during said delaying step c).

3. In a system including a SCSI bus and at least one device attached thereto requiring control of said bus, a method for implementing bus arbitration comprising the steps of:
   a) pseudo-randomly selecting one time slot of a plurality of time slots wherein each of said plurality of time slots is associated with a delay period before arbitration begins;
   b) awaiting a BUS FREE state on said bus;
   c) delaying arbitration by said device until expiration of the delay period associated with the selected time slot;
   d) arbitrating for said bus on behalf of said device; and
   repeating steps a) through d) in response to a failure to obtain said bus in the arbitrating step d).

4. In a system including a bus and at least one device attached thereto requiring control of said bus, a method for implementing bus arbitration comprising the steps of:
   pseudo-randomly selecting one time slot of a plurality of time slots wherein each of said plurality of time slots is associated with a delay period before arbitration begins;
   awaiting a BUS FREE state on said bus;
   delaying arbitration by said device until expiration of the delay period associated with the selected time slot;
   arbitrating for said bus on behalf of said device; and
   determining the delay period associated with the selected slot as a function of a slot index associated with the selected slot.

5. The method of claim 4 wherein said function comprises the steps of:
   determining a time delay increment as proportional to said slot index; and
   adding said time delay increment to a minimum required delay time to determine said delay period associated with the selected slot.

6. The method of claim 5 wherein said minimum required delay time is the SCSI BUS FREE DELAY time and wherein said time delay increment is determined as substantially equal to:

$$(S-1)\ \mu s$$

where S is said slot index ranging from 1 to a maximum number of slots.

7. In a storage subsystem having at least one bus with a plurality of devices attached thereto, a method operable in association with a device of said plurality of devices for arbitrating control of said bus on behalf of said device comprising the steps of:
   a) defining a plurality of time slots wherein each of said plurality of time slots is associated with a delay period before arbitration begins;

b) associating a probability for use of each of said plurality of time slots with said device;

c) pseudo-randomly selecting one time slot of said plurality of time slots for said device in accordance with said probability associated with said device;

d) awaiting a BUS FREE state on said bus;

e) delaying arbitration by said device until expiration of the delay period associated with the selected time slot; and f) arbitrating for said bus.

8. The method of claim 7 further comprising the step of:
repeating steps d) and e) in response to detection of a BUS BUSY condition during said delaying step e).

9. The method of claim 7 further comprising the steps of:
repeating steps c) through f) in response to a failure to obtain said bus in the arbitrating step f).

10. The method of claim 7 wherein step a) includes the step of:
determining the delay period associated with the selected slot as a function of a slot index associated with the selected slot.

11. The method of claim 10 wherein said function comprises the steps of:
determining a time delay increment as proportional to said slot index; and
adding said time delay increment to a minimum required delay time to determine said delay period associated with the selected slot.

12. The method of claim 11 wherein said minimum required delay time is the SCSI BUS FREE DELAY time and wherein said time delay increment is determined as substantially equal to:

$$(S-1)\,\mu s$$

where S is said slot index ranging from 1 to a maximum number of slots.

13. The method of claim 7 wherein said plurality of time slots comprises M time slots each associated with a unique slot index value of 1 through M and wherein said associating step b) includes the steps of:
assigning a numeric probability value ranging from zero through one to each of said M time slots such that a sum of said numeric probability value for all of said M time slots equals one.

14. The method of claim 13 wherein said plurality of devices each have a ID associated therewith to thereby determine a priority ranging from high to low, and wherein said assigning step comprises the steps of:
assigning a numeric probability value of one to the time slot having a slot index value of M associated therewith and a numeric probability value of zero to each of said time slots having slot index values one through (M−1) associated therewith when said device has highest priority SCSI ID associated therewith; and
assigning a numeric probability value of one half to the time slot having a slot index value of M associated therewith, assigning a numeric probability value of one half to one of said plurality of time slots having a slot index value ranging from one through (M−1) associated therewith, and assigning a numeric probability value of zero to all others of said time slots having slot index values one through (M−1) associated therewith when said device has an ID other than the highest priority associated therewith.

15. The method of claim 14 wherein said plurality of devices includes at most seven devices and wherein said M time slots comprise four time slots and wherein said probabilities for use of one of said four time slots is determined as a function of the priority in accordance with the following table:

| Device Priority | Slot 1 | Slot 2 | Slot 3 | Slot 4 |
|---|---|---|---|---|
| 1 (highest) | 0 | 0 | 0 | 1 |
| 2 | 0 | 0 | .5 | .5 |
| 3 | 0 | 0 | .5 | .5 |
| 4 | 0 | .5 | 0 | .5 |
| 5 | 0 | .5 | 0 | .5 |
| 6 | .5 | 0 | 0 | .5 |
| 7 (lowest) | .5 | 0 | 0 | .5 |

16. The method of claim 14 wherein said plurality of devices includes at most fourteen devices and wherein said M time slots comprise five time slots and wherein said probabilities for use of one of said four time slots is determined as a function of the priority in accordance with the following table:

| Device Priority | Slot 1 | Slot 2 | Slot 3 | Slot 4 | Slot 5 |
|---|---|---|---|---|---|
| 1 (highest) | 0 | 0 | 0 | 0 | 1 |
| 2 | 0 | 0 | 0 | .5 | .5 |
| 3 | 0 | 0 | 0 | .5 | .5 |
| 4 | 0 | 0 | 0 | .5 | .5 |
| 5 | 0 | 0 | .5 | 0 | .5 |
| 6 | 0 | 0 | .5 | 0 | .5 |
| 7 | 0 | 0 | .5 | 0 | .5 |
| 8 | 0 | .5 | 0 | 0 | .5 |
| 9 | 0 | .5 | 0 | 0 | .5 |
| 10 | 0 | .5 | 0 | 0 | .5 |
| 11 | .5 | 0 | 0 | 0 | .5 |
| 12 | .5 | 0 | 0 | 0 | .5 |
| 13 | .5 | 0 | 0 | 0 | .5 |
| 14 (lowest) | .5 | 0 | 0 | 0 | .5 |

17. A system for arbitrating on a bus on behalf of an attached device comprising:

detection means for detecting a need to arbitrate on behalf of said device;

selection means, responsive to said detection means, for pseudo-randomly selecting one of a plurality of time slots wherein each of said plurality of time slots is associated with a delay period before arbitration begins;

means for detecting a BUS FREE state on said bus;

delay means, responsive to said selection means, for delaying arbitration by said device following detection of said BUS FREE state until expiration of the delay period associated with the selected time slot; and arbitration means for arbitrating for said bus on behalf of said device.

18. The system of claim 17 further comprising:

means for restarting said means for detecting and said delay means in response to detection of a BUS BUSY condition during operation of said delay means.

19. The system of claim 17 further comprising:
    means for restarting said means for detecting and said delay means in response to a failure to obtain said bus by operation of said arbitration means.

20. The system of claim 17 wherein said selection means includes:
    means for determining the delay period associated with the selected slot as a function of a slot index associated with said selected slot.

21. The system of claim 20 wherein said means for determining the delay period is operable in accordance with the function:

$$T_s = 0.8 + (S-1) \, \mu s$$

where S is said slot index ranging from 1 to a maximum number of slots and $T_s$ is said delay period.

22. The system of claim 17 wherein said plurality of time slots comprises M time slots each associated with a unique slot index value of 1 through M, the system further comprising:
    means for assigning a numeric probability value ranging from zero through one to each of said M time slots such that a sum of said numeric probability value for all of said M time slots equals one.

23. The system of claim 22 wherein said plurality of devices each have an ID associated therewith to thereby determine a priority ranging from high to low, and wherein said means for assigning a numeric probability includes:
    means for assigning a numeric probability value of one to the time slot having a slot index value of M associated therewith and a numeric probability value of zero to each of said time slots having slot index values one through (M−1) associated therewith when said device has highest priority SCSI ID associated therewith; and
    means for assigning a numeric probability value of one half to the time slot having a slot index value of M associated therewith, assigning a numeric probability value of one half to one of said plurality of time slots having a slot index value ranging from one through (M−1) associated therewith, and assigning a numeric probability value of zero to all others of said time slots having slot index values one through (M−1) associated therewith when said device has an ID other than the highest priority associated therewith.

24. The system of claim 23 wherein said plurality of devices includes at most seven devices and wherein said M time slots comprise four time slots and wherein said probabilities for use of one of said four time slots is determined as a function of the priority in accordance with the following table:

| Device Priority | Slot 1 | Slot 2 | Slot 3 | Slot 4 |
| --- | --- | --- | --- | --- |
| 1 (highest) | 0 | 0 | 0 | 1 |
| 2 | 0 | 0 | .5 | .5 |
| 3 | 0 | 0 | .5 | .5 |
| 4 | 0 | .5 | 0 | .5 |
| 5 | 0 | .5 | 0 | .5 |
| 6 | .5 | 0 | 0 | .5 |
| 7 (lowest) | .5 | 0 | 0 | .5 |

25. The system of claim 23 wherein said plurality of devices includes at most fourteen devices and wherein said M time slots comprise five time slots and wherein said probabilities for use of one of said four time slots is determined as a function of the priority in accordance with the following table:

| Device Priority | Slot 1 | Slot 2 | Slot 3 | Slot 4 | Slot 5 |
| --- | --- | --- | --- | --- | --- |
| 1 (highest) | 0 | 0 | 0 | 0 | 1 |
| 2 | 0 | 0 | 0 | .5 | .5 |
| 3 | 0 | 0 | 0 | .5 | .5 |
| 4 | 0 | 0 | 0 | .5 | .5 |
| 5 | 0 | 0 | .5 | 0 | .5 |
| 6 | 0 | 0 | .5 | 0 | .5 |
| 7 | 0 | 0 | .5 | 0 | .5 |
| 8 | 0 | .5 | 0 | 0 | .5 |
| 9 | 0 | .5 | 0 | 0 | .5 |
| 10 | 0 | .5 | 0 | 0 | .5 |
| 11 | .5 | 0 | 0 | 0 | .5 |
| 12 | .5 | 0 | 0 | 0 | .5 |
| 13 | .5 | 0 | 0 | 0 | .5 |
| 14 (lowest) | .5 | 0 | 0 | 0 | .5 |

26. A method for arbitrating amongst a plurality of devices, comprising the steps of:
    (a) for each of the plurality of devices, pseudo-randomly selecting an arbitration delay period from a plurality of arbitration delay periods; and
    (b) selecting a highest priority device from among those devices having a smallest arbitration delay period as selected in step (a).

* * * * *